D.C. CONTROLLED SEMICONDUCTOR SWITCH FOR A.C. CURRENT

Filed Dec. 15, 1960

INVENTOR.
WILLIAM FITZWATER JR.
BY Edward A. Sokolski
AGENT

United States Patent Office
3,165,640
Patented Jan. 12, 1965

3,165,640
D.C. CONTROLLED SEMICONDUCTOR SWITCH FOR A.C. CURRENT

William Fitzwater, Jr., Santa Ana, Calif., assignor to North American Aviation, Inc.
Filed Dec. 15, 1960, Ser. No. 76,021
10 Claims. (Cl. 307—88.5)

This invention relates in general to electronic switching circuits, and more particularly to an electronic switch having a low threshold of operation.

In a complex vehicle system such as a guided missile, trajectory control is often effected through control of the propulsion units which propel the vehicle. Such control is accomplished through selection of specific combinations of propulsion units for timed operation to effect pitching and yawing movements upon, together with the associated forward accelerations of, the vehicle to perform a desired trajectory.

The criterion for the selection of the combinations of propulsion units for timed operation together involves measurements by inertial navigation components, computations by a trajectory computer, and flight path stabilization by a flight control system, all programmed by means of a suitable logic system.

Such a logic system preferably employs switching circuits which are desirably compatible with all the missile subsystems with which they are intended to cooperate. One form of compatibility to be required is the ability to switch D.C. electrical signals without regard to the polarity of the signal to be switched. Such a requirement arises from the analog nature of the missile control signals being so programmed or switched. Such a characteristic of the switch necessarily also infers the ability to switch A.C. signals. The simple on-off logic to which such a switch is intended to respond can be represented by the absence or presence of a switch control voltage of a given sense or polarity. Further, for high performance the device should not be oversensitive to the magnitude of such control voltages. Therefore, another requirement of such a logic switch is that it be capable of being actuated by switching control signals of a signal polarity and of low thresholds.

While the specifications of the present invention readily lend themselves to use in a guided missile logic system, the switch is capable of wide application in many different fields which are suggested by the advantages of the invention as described herein.

Many types of logic system applications employ relay-type devices for accomplishing switching functions. However, relays display certain inherent disadvantages in that they have a limited operational life or mean-time-to-failure, are subject to malfunction in high-vibration environments, and usually require more power than is readily available. This latter feature necessitates the provision of special additional power sources. While electronic switching devices have been devised, employing solid-state semi-conductor devices which are not subject to these disadvantages, yet such electronic devices have not demonstrated to a satisfactory degree the combined features of bi-directional conductivity and low threshold of operation.

Accordingly, a general object of this invention is to provide improved electronic means for low threshold D.C. signal switching of a bi-directional circuit.

In carrying out the principles of this invention in accordance with a preferred embodiment thereof, there is provided a unique D.C. controlled A.C. signal switch of low threshold, a rectifier with filter responsively connected to the output of the A.C. switch, and an improved bi-directional electronic switch responsively connected to the output of the filter.

An object of this invention therefore is to provide electronic means for bi-directional switching.

Another object of this invention is to provide electronic means for switching A.C. or D.C. signals.

Yet another object of this invention is to provide low threshold switching means suitable for operation in high-vibration environments.

These and other objects of the invention will become apparent from the accompanying descriptions taken in connection with the accompanying drawings in which.

Figures 1, 2:
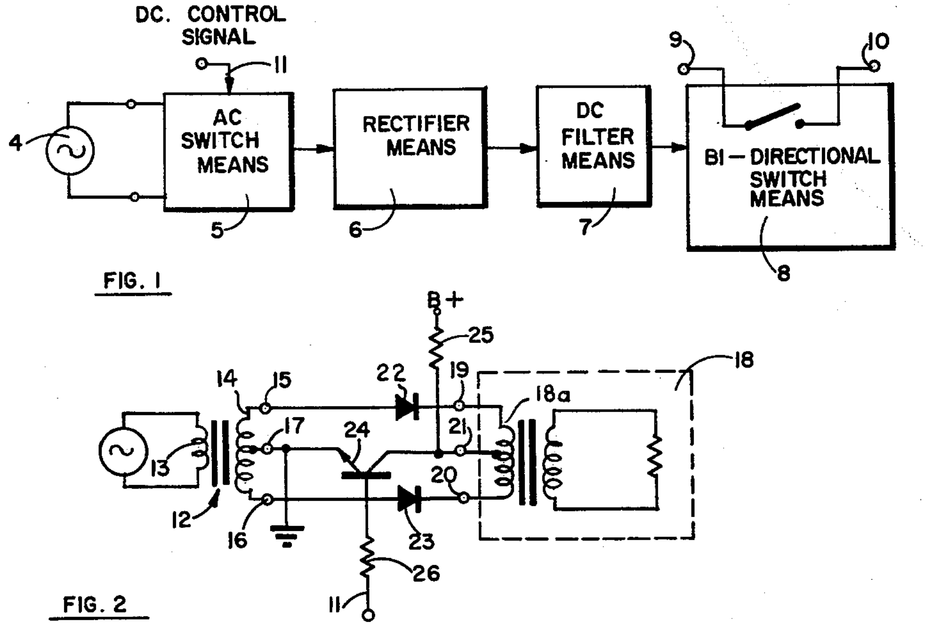
FIG. 1 is a functional block diagram of the device of this invention.
FIG. 2 is a schematic diagram of a first embodiment of a D.C. operated A.C. switch of the invention.

Referring to FIGURE 1, a functional block diagram of the device of this invention is illustrated. A source of A.C. power 4 is fed through an A.C. switch means 5, to a load comprising a rectifier means 6, a D.C. filter means 7, and a bi-directional switch means 8, having switch terminals 9 and 10. Control of A.C. switch 5 is achieved through the application of a D.C. control signal of a fixed polarity or sense on line 11 of the A.C. switch. The presence of such a control signal causes the A.C. switch to be conductive between the A.C. power source and the load, whereby the operation of the rectifier means 6 and filter means 7 cause the bi-directional switch 8 to be conductive to D.C. analog signals applied across terminals 9 and 10.

Referring to FIG. 2, a first embodiment of the A.C. switch means 5 of FIG. 1 is illustrated, and comprises an input transformer 12 having a magnetic core and a two terminal input winding 13 for connection to an A.C. power source and a three terminal output winding 14 including first and second end terminals 15 and 16 and a centertap terminal 17. A three terminal input load impedance 18, shown as a winding 18*a* and including first and second end terminals 19 and 20 and a centertap terminal 21, is connected to the output of transformer 12 for push-pull operation by means of oppositely-poled unidirectional conductive devices, diodes 22 and 23. Diode 22 is connected in a forward conductive direction from the input transformer 12 to load impedance 18 between first end terminals 15 of element 14 and first end terminal 19 of element 18. Similarly, element 23 is connected in a forward conductive direction from input transformer 12 to load impedance 18 between second end terminal 16 of element 14 and second end terminal 20 of element 18. The push-pull circuit is completed by the connection of a transistor or semi-conductor switch means 24 between centertap terminal 17 of element 14 and centertap terminal 21 of element 18, the transistor emitter being connected to terminal 17 and its collector being connected to terminal 21. Operability of semi-conductor switch means 24 is achieved by further connecting the collector to a battery supply through load resistor 25, and grounding the emitter. Line 11 is connected in series with resistor 26 to the base of transistor 24 to provide means of applying switching signals.

Operation of the switch is produced by application of a D.-C. switching signal of positive sense on line 11, which causes the external connection between terminals 17 and 21 to be conductive as to produce push-pull coupling of a A.-C. energy between the output of transformer 12 and the load impedance 18. In other words, in the "on" condition (e.g., conducting) of transistor 24, the diodes 22 and 23 will alternately conduct on each half cycle of the A.-C. power source. When the switching signal is removed from line 11, transistor 24 is in the "off" condition (e.g., cut-off), whereupon the potential at centertap 21 of load impedance 18 rises almost to the battery supply voltage. This potential rise at centertap 21 results in reverse biasing of diodes 22 and 23, thereby preventing them from conducting. The difference between the battery supply voltage and the potential at centertap 21 is equal to the voltage drop across resistor 25 caused by leakage currents of diodes 22 and 23. However, this leakage is normally quite small if silicon diodes and transistors are used. A necessary restriction on the back-bias potential at centertap terminal 21 (and hence an implied restriction on the battery supply voltage) is that the magnitude of back-bias potential must exceed that of the peak output voltage as measured across the centertap and an end terminal of the output winding of transformer 12.

The circuit illustrated in FIG. 2 is described for NPN type transistors. If PNP or other configuration semiconductor devices are used, it is understood that the connection of the diodes and the polarity of the battery supply voltage must be reversed.

In practical operation, the feasibility of the embodiment of the A.-C. switch illustrated in FIG. 2 is limited to signals having a minimum amplitude of at least several volts because of the non-linear operating regions of the diodes, including threshold effects. This disadvantage is minimized in the modification shown in FIG. 3.

Figure 3:
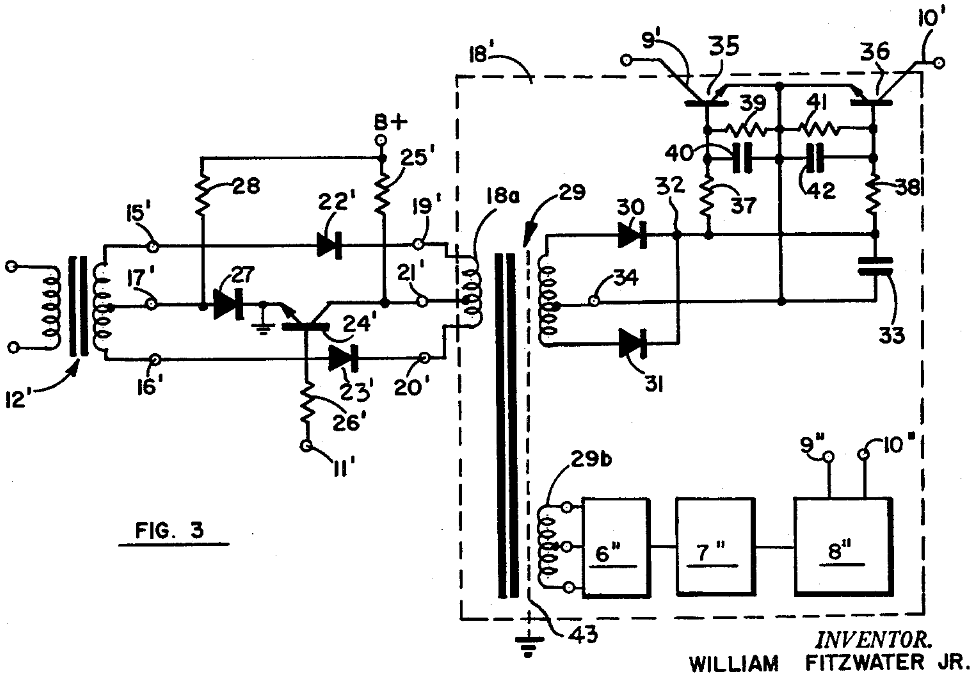
FIG. 3 is a schematic diagram of a preferred embodiment for the device of the invention.

Referring to FIG. 3, a preferred embodiment is shown for the block diagram of FIG. 1. In FIG. 3 the A.-C. switch means 5 of FIG. 1 is represented by an improvement over the first embodiment of the A.-C. switch means illustrated in FIG. 2, and is indicated by elements similarly arranged and numbered as the elements of FIG. 2 with the inclusion of a prime notation plus the addition of elements 27 and 28. Elements 11', 12', 18', 22', 23', 24' are all constructed and arranged as are the correspondingly designated elements shown in the embodiment of FIG. 2. A diode 27 is connected between centertap terminal 17' and the grounded emitter of transistor 24' with forward conducting direction from the centertap to the transistor. Resistor 28 is connected between the battery supply source and the centertap connection 17' of the diode 27. The function of elements 27 and 28 is to improve the threshold characteristic of the A.-C. switch means over that normally obtained from the use of silicon diodes or rectifiers for elements 22' and 23'. This function is achieved for elements 22' and 23' by the common forward biasing effect upon elements 22' and 23' of the voltage drop or potential difference across diode 27 due to the bias current flowing through element 27 as determined by the value of resistor 28.

The common biasing of elements 22' and 23' employs the voltage drop across element 27 caused by conduction in the forward direction to ground. In other words, biasing diode 27 by means of resistor 28 connected between the diode 27 and the battery supply source establishes an operating point out of the threshold region for diode 27, causing forward conduction with a potential drop or bias thereacross. Such operating point for element 27 is sufficiently removed from the threshold region of element 27 that push-pull signal conduction between centertap terminals 21' and 17' by means of element 27 represents merely an incremental, signal current in a reversely conducting direction which is manifested as a small change or incremental shift in the forward-conduction operating point of element 27. Hence, diode 27 is biased to conduct at all times. Accordingly, the voltage drop across diode 27 provides a continuous forward bias of both diodes 22' and 23' to effectively decrease the operative threshold of the diodes. However, in selecting design values for element 28, if the bias current through element 27 does not exceed the peak current drawn by load circuit 18' voltage limiting effects may occur which will adversely affect the performance of the circuit. Therefore, the design value selected for element 37 must be chosen to assure that the bias current through element 27 exceeds the current drawn by load circuit 18'.

The other functional elements of the preferred embodiment of this invention constituting the rectifier means 6, a D.-C. filter means 7, and bi-directional switch 8 of FIG. 1 are contained within dotted box 18' of FIG. 3. Rectifier means 6 is comprised of transformer 29 having a magnetic core and a centertapped input and centertapped output windings, and a pair of oppositely poled unidirectionally conductive means, diodes 30 and 31, connected together by means of a back-to-back connection at junction 32 and being further connected between the two end terminals of transformer 29. A capacitor 33 is connected across junction 32 and a centertap terminal 34 of the output winding of transformer 29. This capacitor comprises a first filter section.

Bi-directional switch means 8 is comprised of a first and second switching transistor 35 and 36, the emitter of each of transistors 35 and 36 being connected to the other, the collector of transistor 35 being connected to switching terminal 9', and the collector of transistor 36 being connected to switching terminal 10'. The bi-directional switching means is connected in circuit with the rectifier means by means of first series resistor 37 connected between the base of first switching transistor 35 and junction 32, and second series resistor 38 connected between the base of second switching transistor 36 and junction 32. A first shunting resistor 39 and first shunting capacitor 40 are each connected between the base and emitter electrodes of first switching transistor 35, and a second shunting resistor 41 and second shunting capacitor 42 are each connected between the base and emitter electrodes of second switching transistor 36.

A bi-directional switch employing a pair of switching transistors was first described by R. L. Bright in "Junction Transistors Used as Switches," Proceedings of the Institute of Radio Engineers, March 1955, on pages 111–121. Basically, two transistors are required for the "off" state of the bi-directional switch because a transistor can block a voltage of only one polarity. In the "on" state, one of the two transistors is operating normally in the saturated condition, while the other transistor is passing reverse currents. Therefore, the base of the other transistor while passing reverse currents must employ a base drive or control signal greater than the signal being passed in order to prevent reversal also of the base-to-emitted current.

The bi-directional switch described by Bright is not a perfect switch. In the "on" state, the switch demonstrates a series resistance between the switching terminals 9' and 10' due primarily to the saturation resistances of the transistors, and further demonstrates a voltage offset due to transistor unbalance. In the "off" state, transistor leakage and circuit noise may occur due to transistor and circuit capacitances. Further, critical applications may require transistor selection and matching. However, the embodiment of the subject invention as illustrated in FIG. 3 avoids the severity of these effects, as will be explained.

Series resistors 37 and 38 serve dual functions. First, each serves as the single drive input impedance for a separate one of the two switching transistors 35 and 36, rather than providing a common input impedance for both of switching transistors 35 and 36. If a single common driving impedance were employed, under the circumstances of the back-to-back connection of transistors 35 and 36, a cumulative unbalance might occur between the two transistors, resulting in one transistor over-conducting and the other being cut off. Hence, the performance advantage achieved with the arrangement described for resistors 37 and 38 is to avoid such cumulative unbalance. A second function performed by resistors 37 and 38 in cooperation with shunting capacitors 40 and 42, respectively, is to provide a second filter section to the rectified A.-C. switch output signal appearing across junction 32 and centertap terminal 34.

Shunting resistors 39 and 41 also serve dual functions.

First, each provides a shunt path for transistor leakage currents in order to prevent such leakage currents from inadvertently turning the transistors "on," thereby assuring an increased degree of affirmative control over the bidirectional switching circuit. A second function performed by shunting resistors 39 and 41 is that each shunts the drive circuit to one of the two bi-directional switching transistors 35 and 36 to assure that shunting capacitors 40 and 42 discharge when the A.-C. signal switch is "off," thereby further increasing the affirmative control over the bi-directional switch.

An electrostatic shield 43 may be added for use with output transformer 29 for noise reduction. Also, since the bi-directional switch and its drive are isolated from ground, either A.-C. or D.-C. signals may be switched at terminals 9′ and 10′. Further, a plurality of bi-directional switches may be driven by means of the single D.-C. driven A.-C. switch means 5 by mounting an additional output winding 29*b* on output transformer 29 for each such additional switching function desired, and adding associated rectifier means, filter means and bi-directional switch means, all substantially similar to and similarly arranged as like means illustrated in the embodiment of FIG. 3.

The following is an exemplary list of components and values therefor found to be satisfactory in a successfully operated embodiment of the invention illustrated in FIG. 3:

Battery supply at 15 volts D.-C.

| | | |
|---|---|---|
| Transistors 24, 35 and 36 | | Type 2N657 |
| Diodes 22, 23, 27, 30 and 31 | | Type 1N485B |
| Capacitors 33, 40 and 42 | microfarads | 2 |
| Resistors 38 and 41 | ohms | 2,200 |
| Resistors 37 and 38 | do | 1,800 |
| Resistor 25 | do | 10,000 |

Such an exemplary embodiment has satisfactorily operated in response to signal switching currents as low as 3 milliamperes.

Thus the device of the present invention provides a substantially improved electronic switch means of extremely low threshold sensitivity for rapid switching of D.-C. analog signals.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A switching circuit comprising a source of alternating-current power, A.-C. switch means responsive to a switch control signal for selectively controlled passage of a signal from the source, a pair of switching transistors series connected between terminals to be switched, a rectifier responsively connected to said alternating-current switch means, a first filter connected between said rectifier and one of said transistors and a second filter connected between said rectifier and the other of said transistors.

2. A switching circuit comprising a source of alternating-current power, A.-C. switch means responsive to a switch control signal for selectively controlled passage of a signal from the source, a pair of switching transistors series connected between terminals to be switched, a rectifier responsively connected to said alternating-current switch means, a first filter connected between said rectifier and one of said transistors and a second filter connected between said rectifier and the other of said transistors, each said filter comprising a resistor series connected between the rectifier and base of a respective transistor and a parallel resistor and capacitance circuit coupled between base and emitter of a respective transistor, and a capacitor connected in common across both said parallel circuits.

3. A bi-directional switching circuit responsive to direct-current switching currents of a single polarity, a first and second transistor, each of said transistors having a base, an emitter electrode, and a collector electrode, one of said collector and emitter electrodes of said first transistor being connected to the corresponding electrode of said second transistor; the other of said collector and emitter electrodes of said first transistor and the corresponding electrode of said second transistor comprising two terminals of a two terminal series switching impedance; means interconnecting the bases of said transistors for reducing leakage currents; alternating-current input driving means; filtered rectifier means responsively connected to said driving means for providing a rectified driving signal; means separately connecting the base of each of said first and second transistors to said rectifying means for separately limiting the base current in each of said transistors, said alternating-current input driving means comprising: a coupling impedance having a three terminal input including first and second end terminals and a centertap; an input transformer having a two terminal input winding connected to an alternating-current power source and a three terminal output winding including first and second end terminals and a centertap; a switching transistor having an emitter, collector, and base, said collector being connected to a direct-current reference voltage source by means of a series impedance, said emitter being connected to a common ground source and said centertap of said output winding of said input transformer, and said base being connected to a source of low current direct-current switching signals of like polarity as said reference voltage source; said centertap of said load impedance being connected to said collector of said switching transistor; a pair of oppositely poled unidirectional conductive devices, one of said conductive devices connected between said first end terminals, the other of said conductive devices connected between said second end terminals, whereby the presence of direct-current switching signals on the base of said switching transistor causes a reduction in said series switching impedance.

4. The device as claimed in claim 3 further including means interposed in circuit between said common ground and said centertap of said output winding of said input transformer for reducing the threshold of operation of such device.

5. The device claimed in claim 4 wherein said means for reducing the threshold comprises a diode, including impedance means connected between said centertap of said output winding of said input transformer and said direct-current reference voltage source.

6. An alternating-current switching circuit comprising a load impedance having a three terminal input including first and second end terminals and a centertap; an input transformer having a two terminal input winding connected to an alternating-current power source and a three terminal output winding including first and second end terminals and a centertap; a transistor having an emitter, collector, and base; said collector being connected by means of a series impedance to a direct-current reference voltage source and being connected to said centertap of said load impedance, said emitter being connected to a common ground source and said centertap of said output winding of said input transformer, and said base being connected to a source of low current direct-current switching signals, a pair of oppositely poled unidirectional conductive devices, one of said conductive devices connected between said first end terminals, the other of said conductive devices connected between said second end terminals, with like poled terminals of said conductive devices being connected to said input end terminals; whereby the presence of direct-current switching signals on the base of said transistor causes alternating-current power transfer to said output impedance.

7. The device claimed in claim 6 further including means interposed in circuit between said common ground and said centertap of said output winding of said input transformer for reducing the threshold of operation of such device.

8. The device claimed in claim 7 wherein said means for reducing the threshold comprises a diode and impedance means connected between said centertap of said output winding of said input transformer and said reference voltage source.

9. A bi-directional switching circuit comprising a first and second transistor, each of said transistors having a base, an emitter electrode, and a collector electrode, one of said collector and emitter electrodes of the first transistor being connected to the corresponding electrode of said second transistor; bi-directionally conductive means interconnecting the bases of said transistors for reducing leakage currents; input means responsive to an alternating-current input signal source; rectifier means responsively connected to said input means for providing a rectified switching signal; means separately connecting the base of each of said first and second transistors to said rectifying means for separately limiting the base current in each of said transistors.

10. A direct-current switch circuit comprising a first and second transistor, each of said transistors having a base, an emitter, and a collector, said emitter of each said transistor being electrically connected to the other; a first and second shunting resistor, said first shunting resistor being electrically connected across the emitter and base of said first transistor, said second shunting resistor being electrically connected across the emitter and base of said second transistor; a magnetic core having a two terminal input winding and a three terminal output winding including a centertap thereon, the output winding centertap being connected to said emitter of said first and second transistors; dual diode means electrically connected together by means of a back-to-back connection and being further connected between the two end terminals of said three terminal winding; a first and second series resistor, said first series resistor being connected in circuit between the base of said first transistor and said back-to-back connection, said second series resistor being connected in circuit between the base of said second transistor and said back-to-back connection, whereby the series impedance between the collectors of said first and second transistors to direct-current signals is substantially insensitive to the polarity of said direct-current signals and is determined by the presence of an alternating-current potential impressed across the terminals of said input winding.

References Cited in the file of this patent

UNITED STATES PATENTS

| | | |
|---|---|---|
| 2,866,103 | Blake et al. | Dec. 23, 1958 |
| 2,866,909 | Trousdale | Dec. 30, 1958 |
| 2,952,785 | Hodder | Sept. 13, 1960 |
| 2,958,808 | Miller | Nov. 1, 1960 |
| 2,967,909 | Rice | Jan. 10, 1961 |